US012689583B2

(12) United States Patent
Hawari et al.

(10) Patent No.: US 12,689,583 B2
(45) Date of Patent: Jul. 21, 2026

(54) VIRTUAL ROUTER FUNCTION SHARDING FOR SCALABLE MULTI-TENANT ROUTING

(71) Applicant: Cisco Technology, Inc., San Jose, CA (US)

(72) Inventors: Mohammed Hawari, Montigny-le-Bretonneux (FR); Jerome Tollet, Paris (FR); Benoit Ganne, Malakoff (FR); Arthur de Kerhor, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 18/325,431

(22) Filed: May 30, 2023

(65) Prior Publication Data

US 2024/0406101 A1 Dec. 5, 2024

(51) Int. Cl.
| | |
|---|---|
| *H04L 45/586* | (2022.01) |
| *H04L 12/46* | (2006.01) |
| *H04L 45/00* | (2022.01) |
| *H04L 45/745* | (2022.01) |

(52) U.S. Cl.
CPC ........ *H04L 45/586* (2013.01); *H04L 12/4633* (2013.01); *H04L 45/66* (2013.01); *H04L 45/745* (2013.01)

(58) Field of Classification Search
CPC ... H04L 45/586; H04L 12/4633; H04L 45/66; H04L 45/745
USPC ......................................................... 370/392
See application file for complete search history.

(56) References Cited

U.S. PATENT DOCUMENTS

| | | | |
|---|---|---|---|
| 2016/0134520 A1 | 5/2016 | Kapadia et al. | |
| 2020/0042641 A1* | 2/2020 | Zhang | G06F 16/328 |
| 2021/0168114 A1 | 6/2021 | Chander et al. | |
| 2021/0359879 A1* | 11/2021 | Yang | H04L 45/18 |
| 2022/0038309 A1* | 2/2022 | Boutros | H04L 12/66 |
| 2022/0078109 A1* | 3/2022 | Hong | H04L 45/586 |
| 2022/0385620 A1* | 12/2022 | Sinha | H04L 61/103 |

FOREIGN PATENT DOCUMENTS

CN          109639557 B          11/2021

OTHER PUBLICATIONS

European Search Report for European Application No. 24178936.1, dated Oct. 24, 2024, 8 Pages.
"Cisco Application Centric Infrastructure (ACI) Design Guide," Cisco, www.cisco.com, Mar. 7, 2023, pp. 1-229.

* cited by examiner

*Primary Examiner* — Hermon Asres
(74) *Attorney, Agent, or Firm* — Polsinelli P.C.

(57) ABSTRACT

Proposed herein at techniques for scalable network traffic steering in a multi-tenant network. In one aspect, a method includes receiving, at an ingress of a multi-tenant network, a data packet, the data packet including a Virtual Network Identifier (VNI) identifying a corresponding tenant for the data packet in the multi-tenant network, and determining, at the ingress, a corresponding cluster of routers for processing the data packet based on the VNI, wherein the corresponding cluster of routers is one of a plurality of clusters of routers in the multi-tenant network. The method further includes forwarding the data packet to a router in the corresponding cluster of routers for processing.

20 Claims, 8 Drawing Sheets

| Shards to Pool Mapping | | |
|---|---|---|
| Last 3 Bits of VNI | Shared Index | Pool |
| 000 | Shard 1 | A |
| 001 | Shard 2 | B |
| 010 | Shard 3 | C |
| 011 | Shard 4 | D |
| 100 | Shard 5 | A |
| 101 | Shard 6 | B |
| 110 | Shard 7 | C |
| 111 | Shard 8 | D |

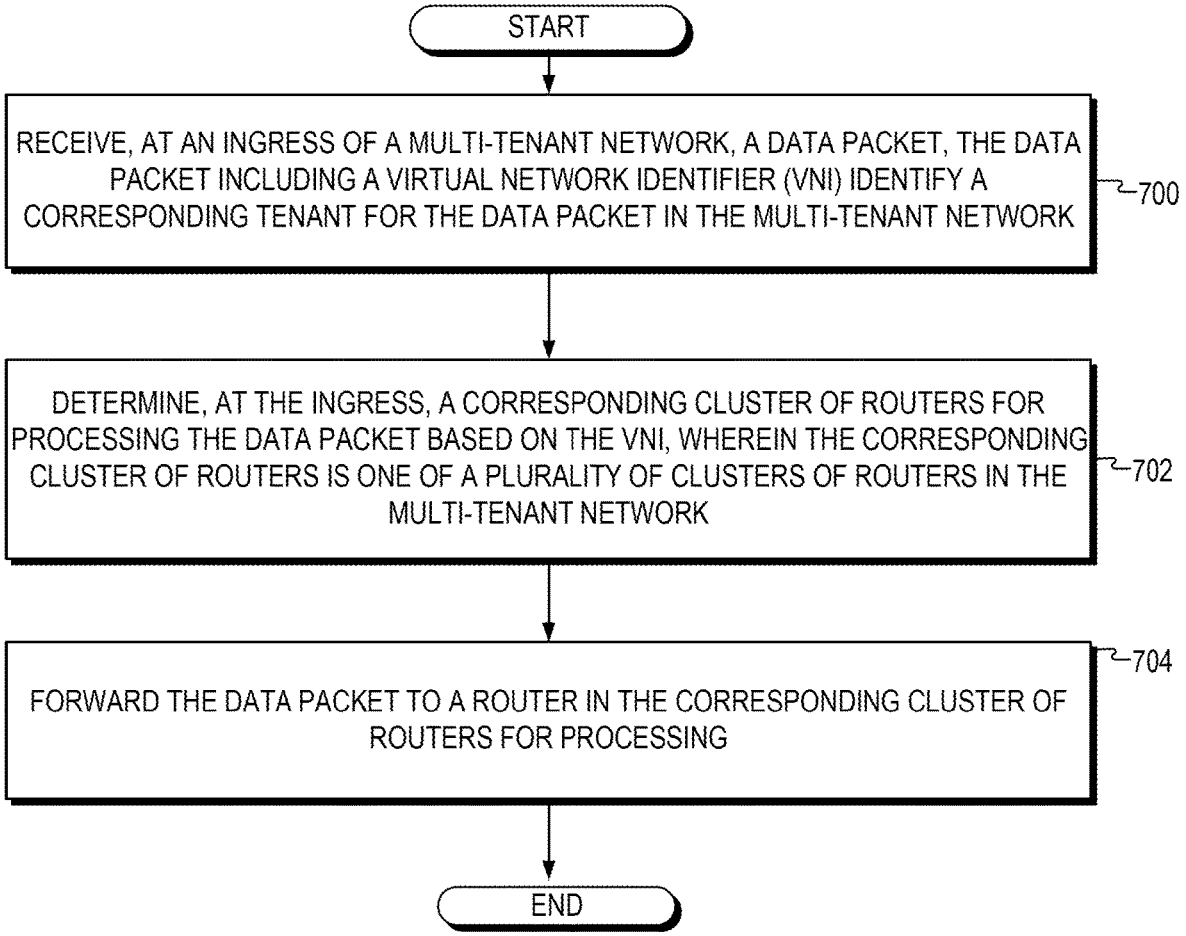

START

RECEIVE, AT AN INGRESS OF A MULTI-TENANT NETWORK, A DATA PACKET, THE DATA PACKET INCLUDING A VIRTUAL NETWORK IDENTIFIER (VNI) IDENTIFY A CORRESPONDING TENANT FOR THE DATA PACKET IN THE MULTI-TENANT NETWORK ~700

DETERMINE, AT THE INGRESS, A CORRESPONDING CLUSTER OF ROUTERS FOR PROCESSING THE DATA PACKET BASED ON THE VNI, WHEREIN THE CORRESPONDING CLUSTER OF ROUTERS IS ONE OF A PLURALITY OF CLUSTERS OF ROUTERS IN THE MULTI-TENANT NETWORK ~702

FORWARD THE DATA PACKET TO A ROUTER IN THE CORRESPONDING CLUSTER OF ROUTERS FOR PROCESSING ~704

END

FIG. 7

VIRTUAL ROUTER FUNCTION SHARDING FOR SCALABLE MULTI-TENANT ROUTING

TECHNICAL FIELD

The present disclosure relates to communication systems, and in particular, to solutions for scaling and optimizing traffic routing in multi-tenant routed networks.

BACKGROUND

Operating multi-tenant routed networks raises scalability issues when the number of tenants is very large (in the order of 100 000 tenants). In such networks, overlays based on Generic Network Virtualization Encapsulation (GENEVE) or Virtual Extensible Local Area Network (VXLAN) are typically used to convey a Virtual Network Identifier (VNI) to discriminate between the different tenants. Consequently, all packet-processing and packet-forwarding-operations take into account this VNI to take a certain routing decision for a given data packet. In one instance, this routing decision is performed by mapping each VNI to a Virtual Router Function (VRF) associated with each tenant and populating the forwarding table of a VRF with tenant-specific entries. This solution does not scale very well when the number of tenants (and thus, the number of VRFs) is extremely large, because, in a typical router, each VRF maintains its own Forwarding Information Base (FIB) structure, with a non-negligible memory footprint (or hardware resource utilization).

Furthermore, a virtual or physical router is not well equipped to handle hundreds of thousands of different FIBs at a time. Moreover, in such a multi-tenant environment, a multi-tenant routing protocol is used to distribute all routing information across all routers (e.g., Border Gateway Protocol (BPG) Virtual Private Network v. 4 (VPNv4)). With a high number of tenants, the size of the Routing Information Base (RIB) maintained by the control plane of each router increases, which in turn increase the memory footprint and the CPU consumption of the control plane.

BRIEF DESCRIPTION OF THE DRAWINGS

FIG. 7 illustrates an example flow diagram for scalable network traffic steering in a multi-tenant network according to some aspects of the present disclosure.

DETAILED DESCRIPTION

Figure 1:
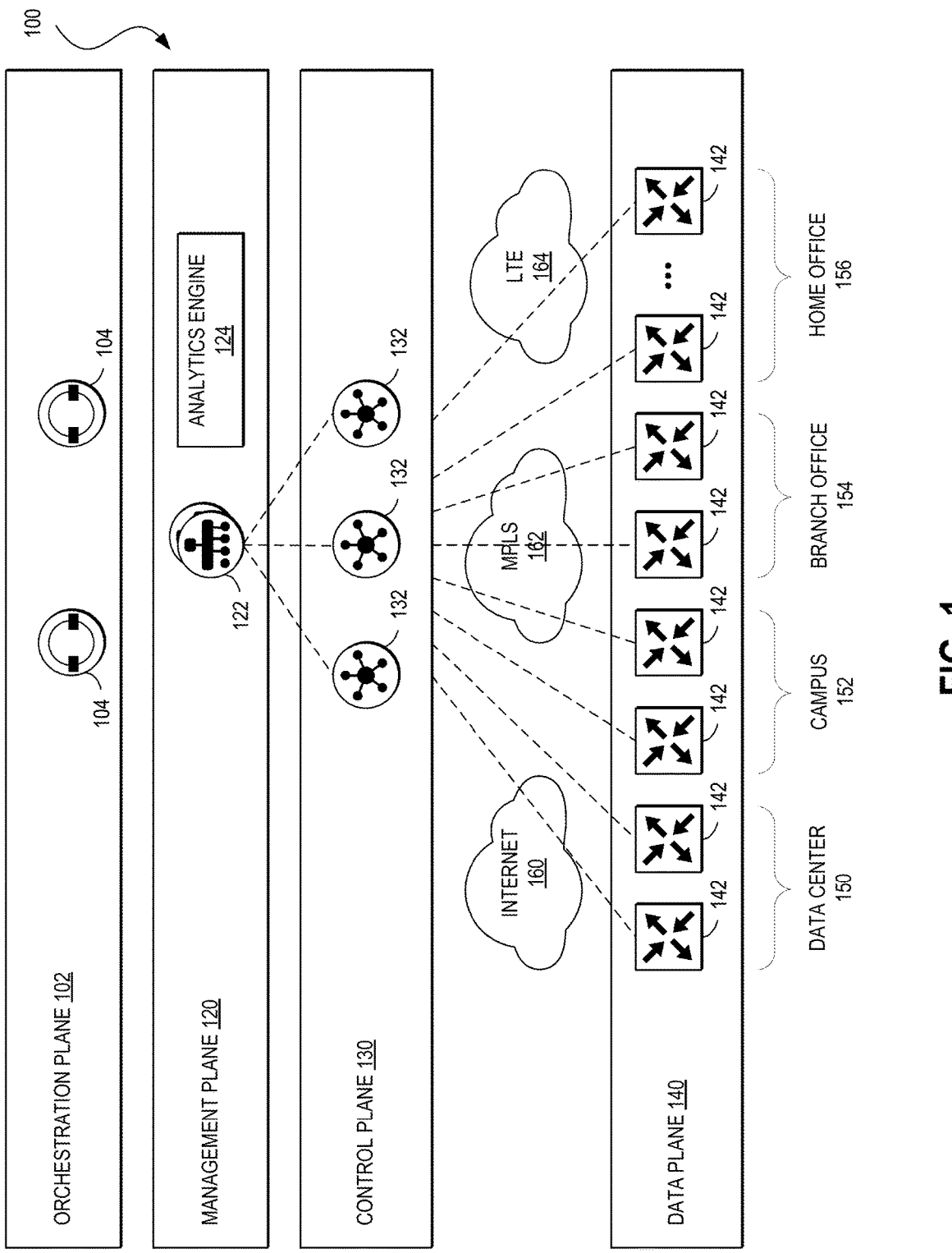
FIG. 1 illustrates an example of a network architecture for implementing aspects of the present technology, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media are provided for scaling and optimizing traffic routing in multi-tenant routed networks. More specifically, techniques are proposed for routing network traffic received at a multi-tenant network to a particular cluster of routers for processing according to the VNI of the network traffic.

In one aspect, a method includes receiving, at an ingress of a multi-tenant network, a data packet, the data packet including a Virtual Network Identifier (VNI) identifying a corresponding tenant for the data packet in the multi-tenant network, and determining, at the ingress, a corresponding cluster of routers for processing the data packet based on the VNI, wherein the corresponding cluster of routers is one of a plurality of clusters of routers in the multi-tenant network. The method further includes forwarding the data packet to a router in the corresponding cluster of routers for processing.

In another aspect, the ingress is a virtualized network function layer configured to parse the data packet for determining the VNI in the data packet.

In another aspect, the ingress is any router in the multi-tenant network.

In another aspect, the method further includes parsing the data packet to identify the VNI, determining a shard index associated with the VNI, and mapping the shard index to the corresponding cluster of routers.

In another aspect, the shard index is mapped to a Virtual IP (VIP) address of the corresponding cluster of routers.

In another aspect, the router is in a same Layer 2 domain as remaining routers in the corresponding cluster of routers, and forwarding the data packet to the router includes altering a Media Access Control (MAC) address in the data packet to reach the router, or forwarding the data packet to the router using an encapsulation protocol.

In another aspect, a control plane of each router in a given cluster of the plurality of clusters of routers receives route updates for VNIs associated with the given cluster of the plurality of clusters of routers.

In one aspect, a network element of a multi-tenant network includes one or more memories having computer-readable instructions stored therein, and one or more processors. The one or more processors are configured to execute the computer-readable instructions to receive a data packet, the data packet including a Virtual Network Identifier (VNI) identifying a corresponding tenant for the data packet in the multi-tenant network, determine a corresponding cluster of routers for processing the data packet based on the VNI, wherein the corresponding cluster of routers is one of a plurality of clusters of routers in the multi-tenant network, and forward the data packet to a router in the corresponding cluster of routers for processing.

In one aspect, one or more non-transitory computer-readable media includes computer-readable instructions, which when executed by one or more processors at an ingress of a multi-tenant network, cause the ingress to receive a data packet, the data packet including a Virtual Network Identifier (VNI) identifying a corresponding tenant for the data packet in the multi-tenant network, determine a corresponding cluster of routers for processing the data packet based on the VNI, wherein the corresponding cluster of routers is one of a plurality of clusters of routers in the multi-tenant network, and forward the data packet to a router in the corresponding cluster of routers for processing.

EXAMPLE EMBODIMENTS

FIG. 1 illustrates an example of a network architecture for implementing aspects of the present technology, according to some aspects of the present disclosure. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122, an analytics engine 124, etc. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
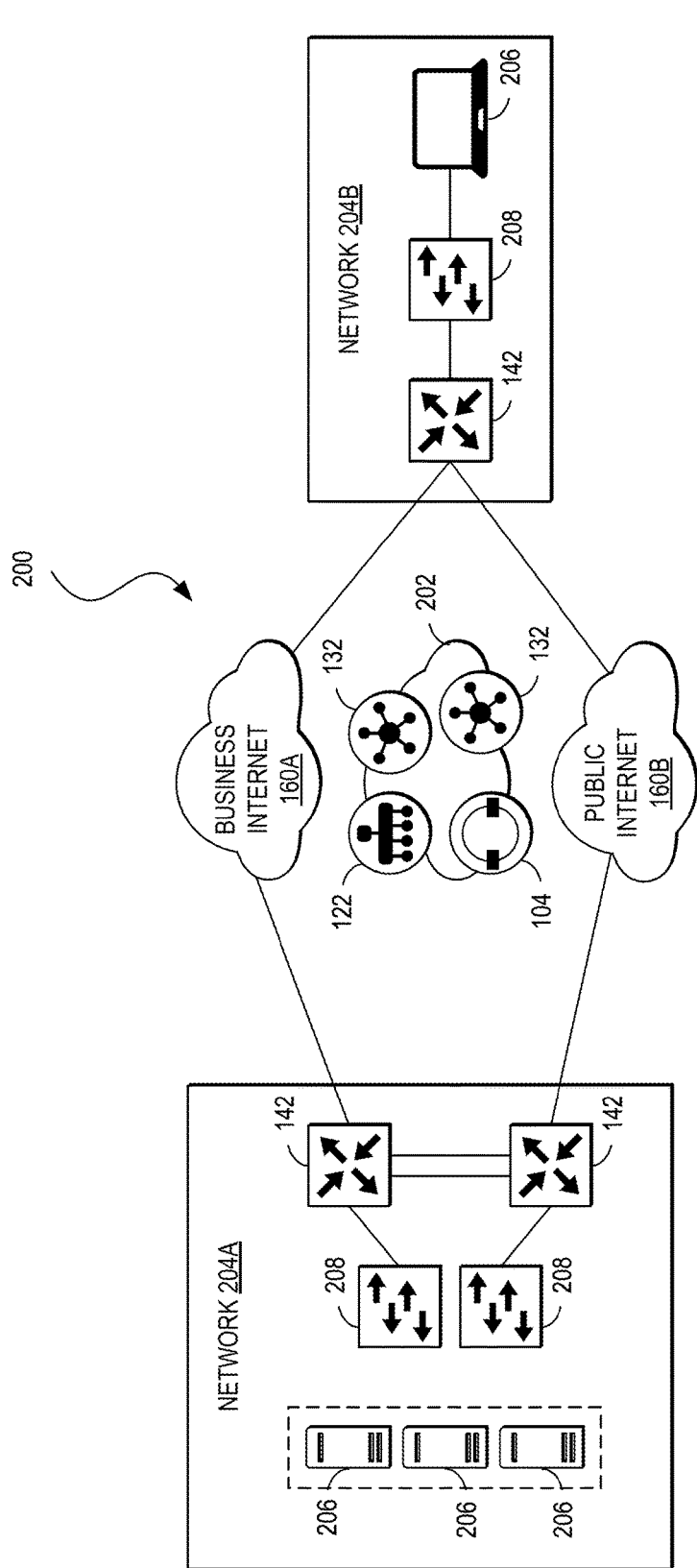
FIG. 2 illustrates an example of a network topology, according to some aspects of the present disclosure.

FIG. 2 illustrates an example of a network topology, according to some aspects of the present disclosure. Network topology 200 shows various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), car devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
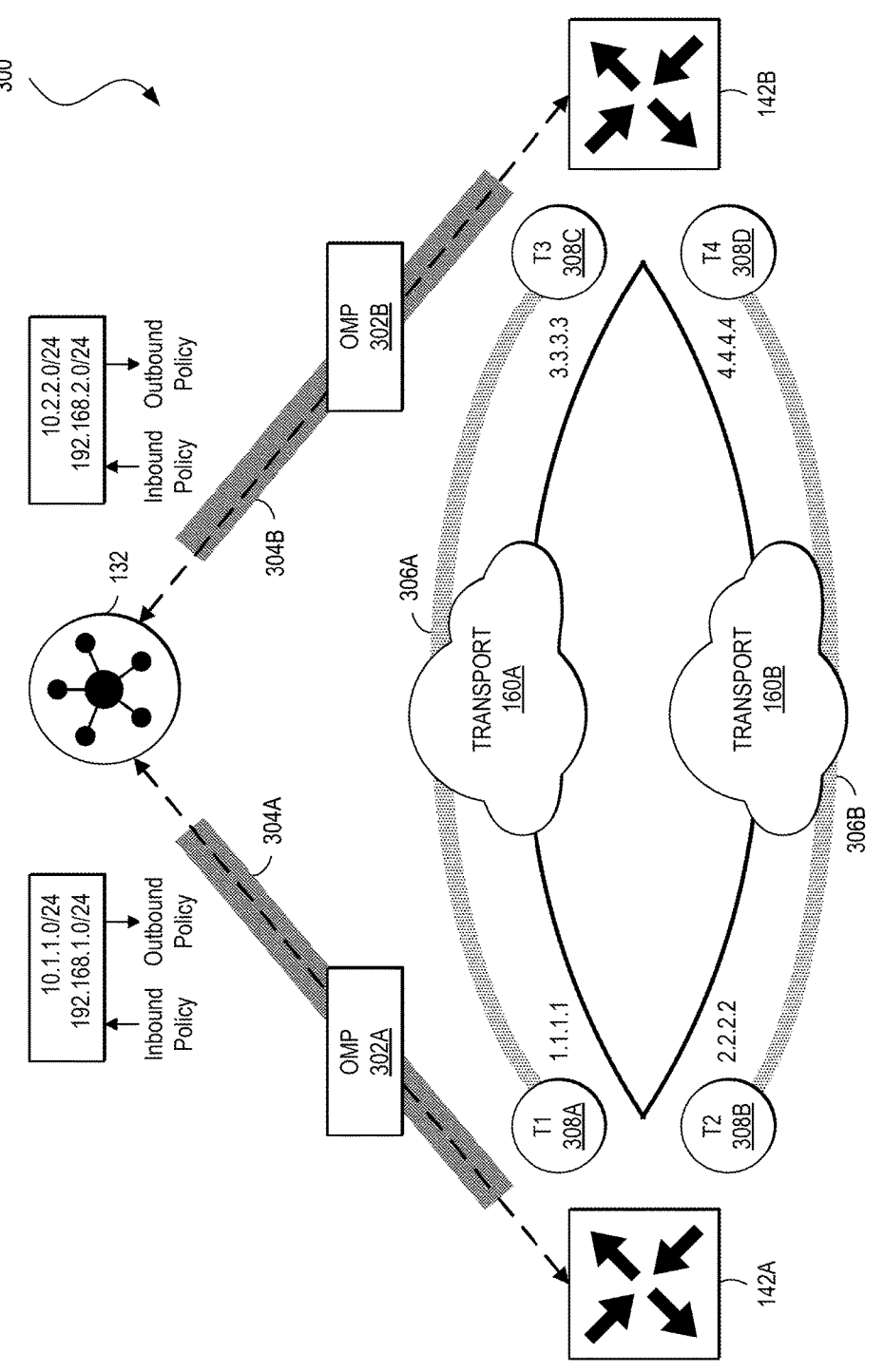
FIG. 3 illustrates an example of a diagram showing the operation of a protocol for managing an overlay network, according to some aspects of the present disclosure.

FIG. 3 illustrates an example of a diagram showing the operation of a protocol for managing an overlay network, according to some aspects of the present disclosure. Example diagram 300 shows the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
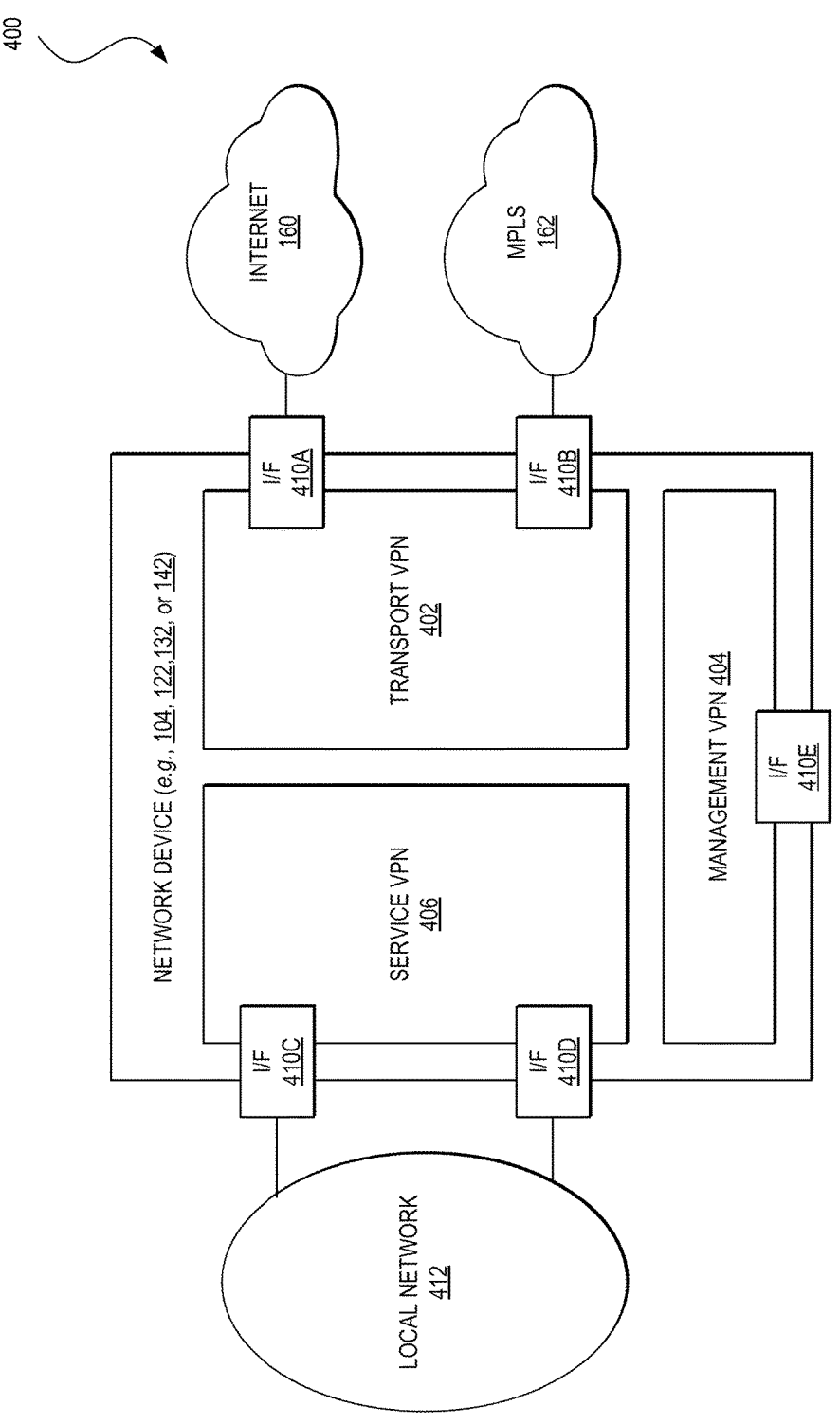
FIG. 4 illustrates an example of a diagram showing the operation of virtual private networks for segmenting a network, according to some aspects of the present disclosure.

FIG. 4 illustrates an example of a diagram showing the operation of virtual private networks for segmenting a network, according to some aspects of the present disclosure. Example diagram 400 shows the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QOS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5:
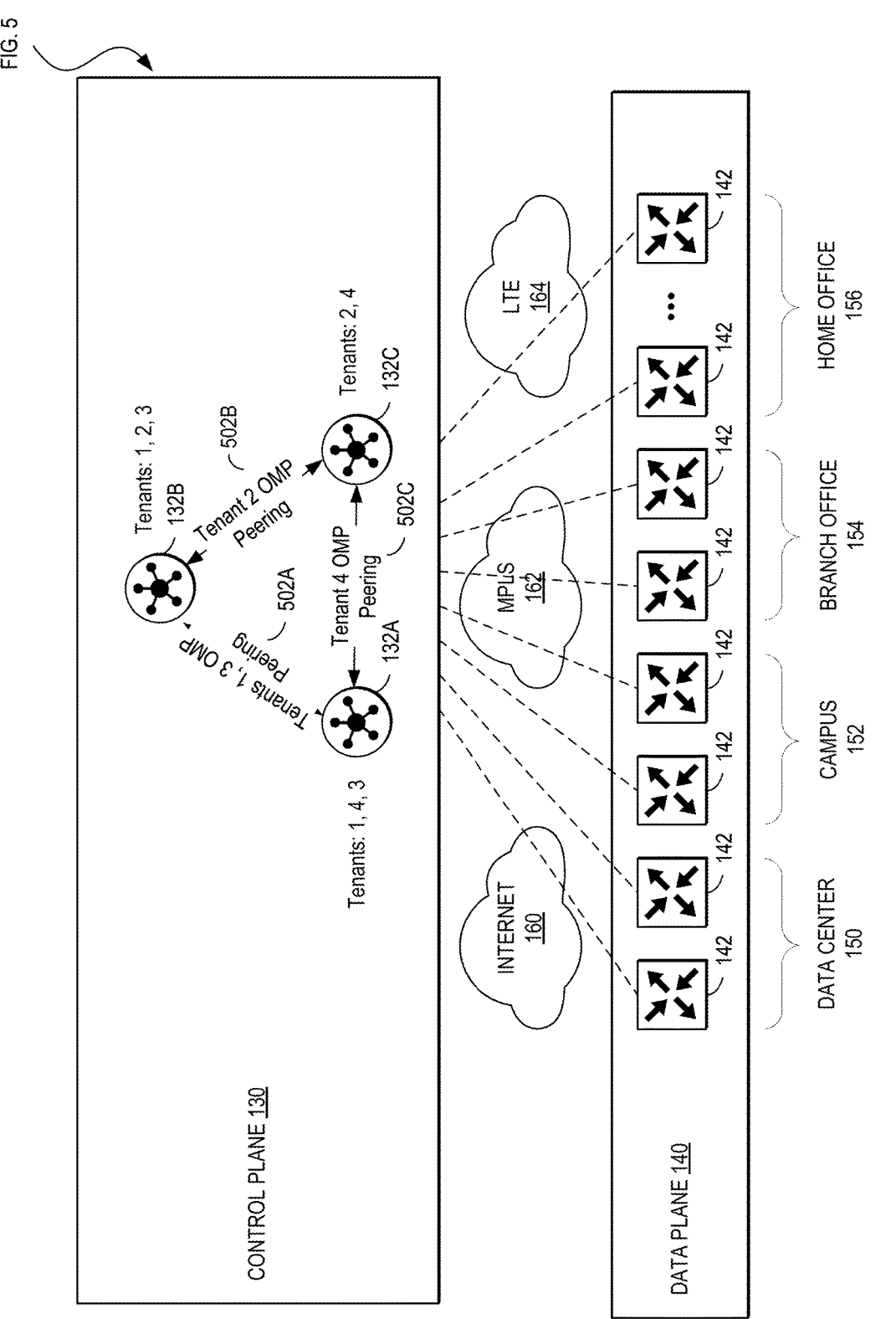
FIG. 5 illustrates an example of a partial high-level network architecture, according to some aspects of the present disclosure.

FIG. 5 illustrates an example of a partial high-level network architecture, according to some aspects of the present disclosure. The control plane 130 can include a cluster of network controller appliances (collectively, 132), including, for example, a first network controller appliance 132A, a second network controller appliance 132B, a third network controller appliance 132C. The cluster of network controller appliances 132 may support route exchange on a per-tenant basis. In a multi-tenant configuration, multiple tenants may be placed on any given network controller appliance. Conversely, each tenant can be hosted on a cluster of network controller appliances as well, for redundancy and load balancing. Peering connections may exist between network controller appliances for route exchange. In some instances, routes may be exchanged between OMP processes running on the network controller appliances.

In a multi-tenant configuration, there may be multiple OMP processes, one per tenant running in a per-tenant namespace. Some other processes, such as processes run by a daemon (e.g., Cisco® SD-WAN vDaemons), may run in a global namespace and are multi-tenant aware and may be configured to multiplex and/or demultiplex OMP packets. With multi-tenancy, the routes may be exchanged between the multiple OMP processes in the cluster of network controller appliances at a per-tenant basis, and the daemon may form connections that facilitate the exchange.

As shown in FIG. 5, in a multi-tenant configuration there may be, for example Tenant 1, Tenant 2, and Tenant 3 hosted on the first network controller appliance 132A, the second network controller appliance 132B, the third network controller appliance 132C in various combinations. Control connections via per-tenant OMP peering 502 may be formed between any given pair of network controller appliances to exchange OMP routes for tenants that each given pair of network controller appliances share. As an example, OMP Peering for Tenants 1 and 3 (Tenants 1, 3 OMP Peering 502A) may be formed between the first network controller appliance 132A and the second network controller appliance 132B. As another example, OMP Peering for Tenant 2 (Tenant 2 OMP Peering 502B) may be formed between the second network controller appliance 132B and the third network controller appliance 132C. As another example, OMP Peering for Tenant 4 (Tenant 4 OMP Peering 502C) may be formed between the third network controller appliance 132C and the first network controller appliance 132A.

In such a multi-tenant configuration, the necessity to maintain per-tenant peer list for each network controller appliance 132 is eliminated and as such is more efficient and converges faster. Each tenant may be placed in an unequal number of network controller appliances 132, depending on the scale of that tenant and the load-balancing/redundancy requirements, thus permitting elasticity in terms of how the tenants are placed. As an example, one tenant can be placed on two of the network controller appliances 132, whereas another can be placed on four network controller appliances 132. The full mesh of OMP peers can be formed depending on the tenant and allowing for this elasticity.

As such, the network controller appliances 132 can exchange the routes and the policy enforcement on a per-tenant and per-VPN basis. This allows tenants to configure and implement different topologies, e.g., a first tenant could implement a Hub and Spoke topology, while a second tenant could implement a full mesh topology.

Furthermore, in a multi-tenant configuration, every router (physical or virtual) has a VRF table stored for determining the correct tenant for a given data packet (network traffic) received at the router. A received data packet has a VNI associated therewith that identifies the correct tenant. The VNI is matched with the correct tenant in the VRF table and forwarded to the right destination based on this matching. As the number of tenants increase in a multi-tenant network (e.g., tens or hundreds of thousands of tenants), the number of entries and hence the size of such VRF table increases. With each VRF maintaining a corresponding FIB structure, the memory footprint and CPU usage of each router increases as the number of tenants increase. This is inefficient and unsustainable.

According to one aspect of the present disclosure, routers in a multi-tenant network are grouped into clusters of routers. All possible VNIs for the tenants of the multi-tenant network are partitioned into subsets, which each subset being assigned to one of the clusters of routers. In this fashion, routers in each cluster need to maintain a VRF table and associated FIB structure for only the VNIs in the subset associated to that cluster.

For instance, all possible VNIs (representing all tenants in the network) are partitioned into N subsets, by some algorithmic, stateless method. As a non-limiting example of such method, the method can be a modulo N operation, or bitmasking of the last log 2(N) bits of each VNI, if N is a power of two. In other words, a method is defined to associate to each VNI, a shard index (e.g., in the set 0, 1, 2, . . . , N−1).

Similarly, routes of the multi-tenant network may be partitioned in a plurality of subsets (pools) M. Partitioning of the routers may be based on any one or more parameters including, but not limited to, processing capacity, load balancing, memory capacity of routers, total sustainable aggregated traffic handling capacity, etc.

With M subsets of routers and N subsets of VNIs, each shardd index of VNIs may be associated with one pool of routers. This mapping may define which VNIs are to be processed by which one(s) of the routers.

A non-limiting example of such mapping may be as follows. There may be four pools of routers (M=4 pools, named A, B, C, and D). VNIs may be mapped into a shred index (e.g., taking the last three bits of the VNI resulting in N=8 shard indices 0, 1, . . . 7). The mapping may then be defined as:

| Shard Index | Pool |
|:-----------:|:----:|
| 0 | A |
| 1 | B |
| 2 | C |
| 3 | D |
| 4 | A |
| 5 | B |
| 6 | C |
| 7 | D |

With such mapping, each packet, upon being received at a router, may be analyzed and processed to determine the VNI thereof. Based on the VNI and the mapping above, the data packet may forwarded for processing and routing to a router belonging to the pool associated to the VNI of the data packet. For example, a packet with a VNI of 30 (which is 1110 in Binary) has a shard index of 6 (last three bits are 110, which is 6). This packet is sent to a router belonging to pool C for processing and forwarding to the corresponding tenant/intended destination.

This process may be referred to as router clustering/partitioning for scalable network traffic routing in a multi-tenant network.

Figure 6:
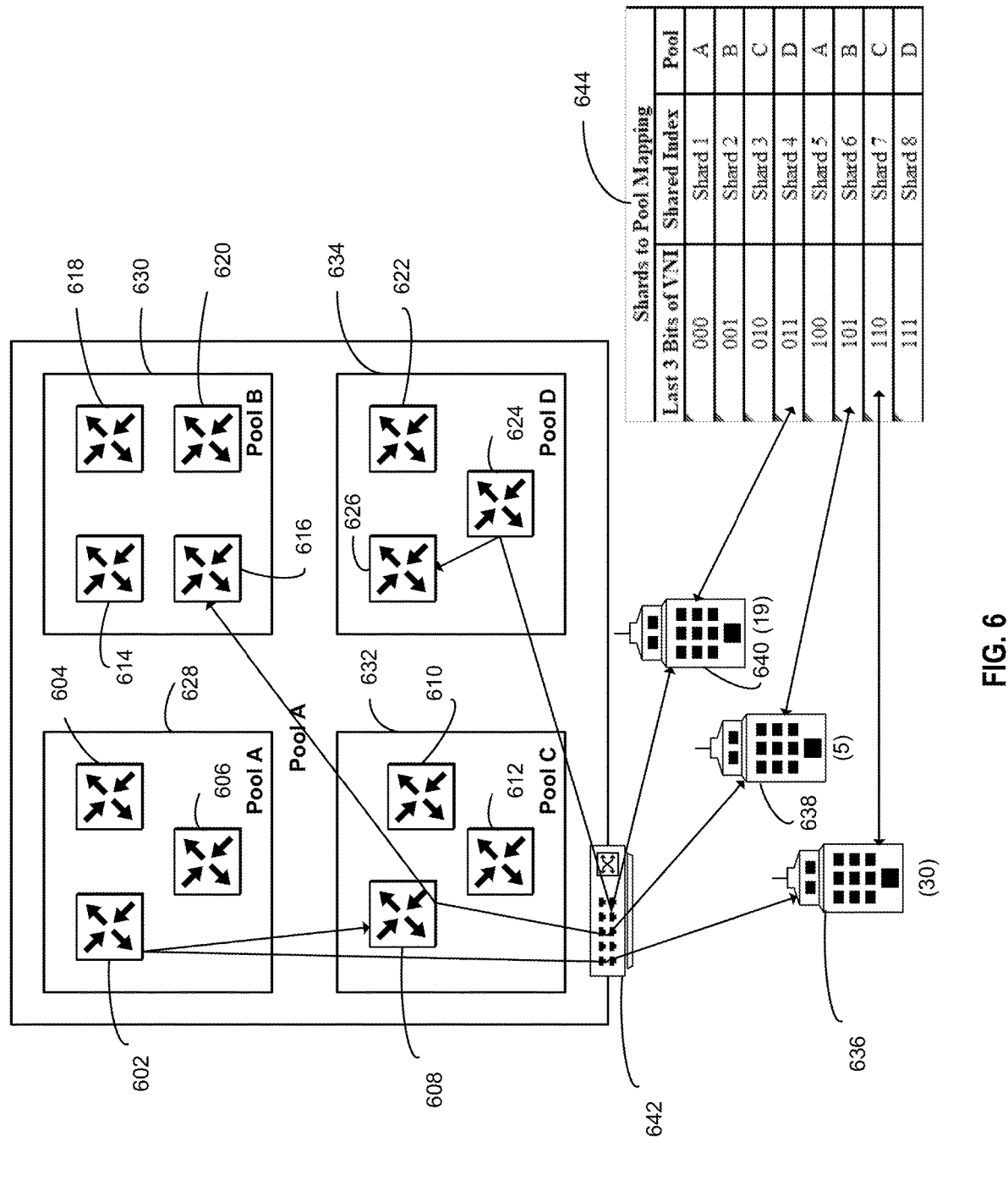
FIG. 6 visually illustrates an example of router clustering for scalable network traffic routing in a multi-tenant network, according to some aspects of the present disclosure.

FIG. 6 visually illustrates an example of router clustering for scalable network traffic routing in a multi-tenant network, according to some aspects of the present disclosure. As shown in example 600, 13 routers 602, 604, 606, 608, 610, 612, 614, 616, 618, 620, 622, 624, and 626 may be partitioned into four pools 628, 630, 632, and 634. Tenants 636, 638, and 640 may represent three different example tenants operating within the multi-tenant network of the present disclosure. Traffic forwarding for each of tenants 636, 638, and 640 may be performed via switch/gateway router 642 and according to shard to pool map 644. Map 644 may be similar to the table described above (Shard Index is Shared 1-8 instead of Shard 0-7 of the example table above).

In example 600, tenant 636 may have a VNI of 30 (which translates into last three bits (110). Map 644 indicates that 110 maps to Shard 7, which is assigned to routers in pool C. As such, when network traffic from tenant 636 arrives at a router (e.g., router 602 in pool A), router 602, based on map 644, forwards the network traffic for tenant 636 to router 608 in pool C for processing and forwarding. In one example, a specific router to forward the network traffic to within a specific pool (e.g., router 608 in pool C) may be selected according to any known or to be developed load balancing algorithm such as Equal Cost Multi-path Routing (ECMP), Maglev based load balancing, etc.

Similarly, tenant 638 may have a VNI of 5 (which translates into last three bits (101). Map 644 indicates that 101 maps to Shard 6, which is assigned to routers in pool B. As such, when network traffic from tenant 638 arrives at a router (e.g., router 624 in pool C), router 608, based on map 644, forwards the network traffic for tenant 638 to router 616 in pool B for processing and forwarding.

Similarly, tenant 640 may have a VNI of 19 (which translates into last three bits (011). Map 644 indicates that 011 maps to Shard 4, which is assigned to routers in pool D. As such, when network traffic from tenant 640 arrives at a router (e.g., router 624 in pool D) and given that router 624 belongs to the correct pool D, either router 624 itself may process and forward data packets for tenant 640 or router 624 may identify the correct router in pool D for processing and forwarding the data packet for tenant 640 (e.g., based on MAC address as will be described below).

It should be noted that map 644 may be stored at each router in the multi-tenant network environment to be used for traffic redirecting and processing.

As illustrated in FIG. 6, there is no guarantee that data packets associated with any tenant may arrive in the multi-tenant network at the correct cluster of routers (correct pool of routers) for processing the same. Therefore, one or more packet steering mechanisms may be applied for redirecting the arrived data packets to the correct pool of routers (e.g., as illustrated with respect to data packets of tenants 636 and 638 in FIG. 6).

In one example, such traffic steering may be performed using a steering layer setup at an ingress of the multi-tenant network. For instance, such steering layer may be setup at gateway router 642 (ingress 642) of the multi-tenant network having clusters 628, 630,632, and 634. This steering layer may be composed of one or multiple identical network functions for parsing the VNI of each packet, determining the shard index, and use the mapping (map 644) to redirect the packet to a router belonging to the right pool of routers. In other words, map 644 may be stored at gateway router 642 and used for steering data packets to their right pool of routers. The steering layer may be setup at one ingress point or multiple ingress points of a multi-tenant network.

In another example, the steering function at the ingress point described above, may be implemented in all routers of the clusters (e.g., routers 602-626 of pools A-D). When a packet is received by any router, regardless of whether the router is in the correct pool for the received data packet, the router may parse the VNI, determine the shard index, and use the mapping (e.g., map 644) to determine the pool on which the packet should be processed. If the router belongs to this pool, the router keeps processing the packet (and performs routing). This is illustrated and described above with respect to tenant 640 in FIG. 6. Otherwise, the packet is redirected to another router belonging to the right pool. This is illustrated and described above with respect to tenants 636 and 638 in FIG. 6.

The steering mechanisms (whether implemented at an ingress point or on each router), rely on the concept of redirecting a packet to a different router. In some instances, all routers may belong to the same L2 domain. In this instance, the steering may be implemented by altering the destination MAC address to reach a given router. In another example, any lightweight encapsulation protocol can be used to transport the packet, over a routed network, to the target of the redirection (e.g., IP-in-IP (IPIP) tunnels, Generic Routing Encapsulation (GRE), etc.).

The steering mechanisms (whether implemented at an ingress point or on each router) to redirect a received data packet to a specific router belonging to the right pool, may require that all addresses of all routers in each pool are known by all routers (or all traffic steering nodes). When using encapsulation-based redirection (e.g., IPIP, GRE, etc.), an alternative to storing addresses of all routers on each router, is to assign a Virtual IP (VIP) address to each pool of routers (e.g., each of pools A-D in FIG. 6), and perform redirections based on this VIP. Accordingly, instead of storing the address of all routers on each router, each router can store only the VIP address of each pool and perform redirection and steering of a data packet to the right pool using the VIP. Once, the data packet arrives at the right pool of routers, the underlying routing infrastructure of the correct pool can determine the specific router for sending the data packet to, by maintaining the association of each VIP to the set of routers in the corresponding pool. This process can shift some state from the multi-tenant routing cluster to the underlay network.

In the scalable network traffic steering architecture described above with reference to FIG. 6, a router belonging to a given pool of routers only needs to know the routes tagged with VNIs matching all the shard indices mapped to the same pool. In example of FIG. 6, routers in pool D (e.g., routers 622, 624, and 626) only need routes tagged with VNIs whose shard index is 3 or 7 (per map 644). As a consequence, the control plane component of each router can filter out all routes received from the routing protocol (e.g., BGP VPNv4) if those routes are tagged with VNI of no interest to such routers (e.g., all VNIs which indices are not 3 or 7). As a consequence, this reduces the number of updates undergone by the data plane Forwarding Information Base (FIB) for routers in pool D, as only a portion of all the updates occurring in the cluster are going to impact the FIB of routers in pool D. Given that reprogramming the FIB, either by complex data structure processing (for software routers) or by Ternary Content-Addressable Memory (TCAM) reprogramming (for hardware routers) is a costly, data-path disrupting operation, the proposed network traffic steering architecture of the present disclosure improves the overall performance of the routers by reducing the number and scale of reprogramming that needs to occur.

In one example, implementing route filtering in the control plane component of each router, as described above, results the control plane component of each router to process all the route updates coming from the routing protocol, even though some updates may be skipped because the corresponding VNI is of no interest to a given router. In one example, and in order to reduce the CPU consumption of the control plane even further, the routing protocol itself can implement route filtering, in such a way that the control plane of each router only subscribes to updates concerning the VNIs of interests (3 and 7 for each of routers 622, 624, and 626 in pool D, in example of FIG. 6). In this instance, a given router only receives updates that are of interest to the router. This mechanism is enabled based on support from the routing protocol and the way peerings are configured (for example, peering with a route reflector but only subscribing to BGP VPNv4 updates with a specific Route Target (if this field is used to carry the VNI)).

FIG. 7 illustrates an example flow diagram for scalable network traffic steering in a multi-tenant network according to some aspects of the present disclosure.

At step 700, a data packet may be received at an ingress (ingress element) of a multi-tenant network. The data packet may include a VNI identifying a corresponding tenant for the data packet in the multi-tenant network.

In one example, the ingress element is a virtualized network function layer configured to parse the data packet for determining the VNI in the data packet. The virtualized network function layer may be implemented at an ingress of a multi-tenant network (e.g., at gateway router 642 in FIG. 6). In another example, the ingress element is any of the routers in the multi-tenant network (e.g., any one of routers 602 to 626 in FIG. 6).

At step 702, the ingress element may determine a corresponding cluster of routers for processing the data packet based on the VNI. In one example, the corresponding cluster of routers is one of a plurality of clusters of routers in the multi-tenant network (e.g., one of pools A-D in FIG. 6).

In one example, determining the corresponding cluster of routers for the data packet includes parsing the data packet to identify the VNI. This parsing may be performed according to any known or to be developed packet inspection and processing method. Once the VNI is identified, a shard index associated with the VNI may be determined using a shard to pool mapping such as map 644 of FIG. 6. A shard may be paired with last 3 bits of VNI as described above. In other examples, any other number of bits of a VNI or any other pairing method for assigning a VNI to a shard may be utilized. Upon determining the shard index, the corresponding cluster of routers may be identified by finding a group identifier for the determined shard index using map 644.

At step 704, the ingress element, may forward (redirect) the data packet to the corresponding cluster of routers identified at step 702 for processing. In one example, forwarding the data packet to the corresponding cluster includes identifying a specific router in the corresponding cluster of routers and forwarding the data packet to the specific router in the corresponding cluster.

In one example, the shard index is mapped to a Virtual IP (VIP) address of the corresponding cluster of routers.

In one example, the router to which the data packet is to be forwarded at step 704 may be in a same Layer 2 domain as remaining routers in the corresponding cluster of routers. In this instance, ingress element may alter a Media Access Control (MAC) address in the data packet to reach the router and/or may forward the data packet to the router using an encapsulation protocol.

In one example, a control plane of each router in a given cluster of the plurality of clusters of routers receives route updates for VNIs associated with the given cluster of the plurality of clusters of routers.

Figure 8:
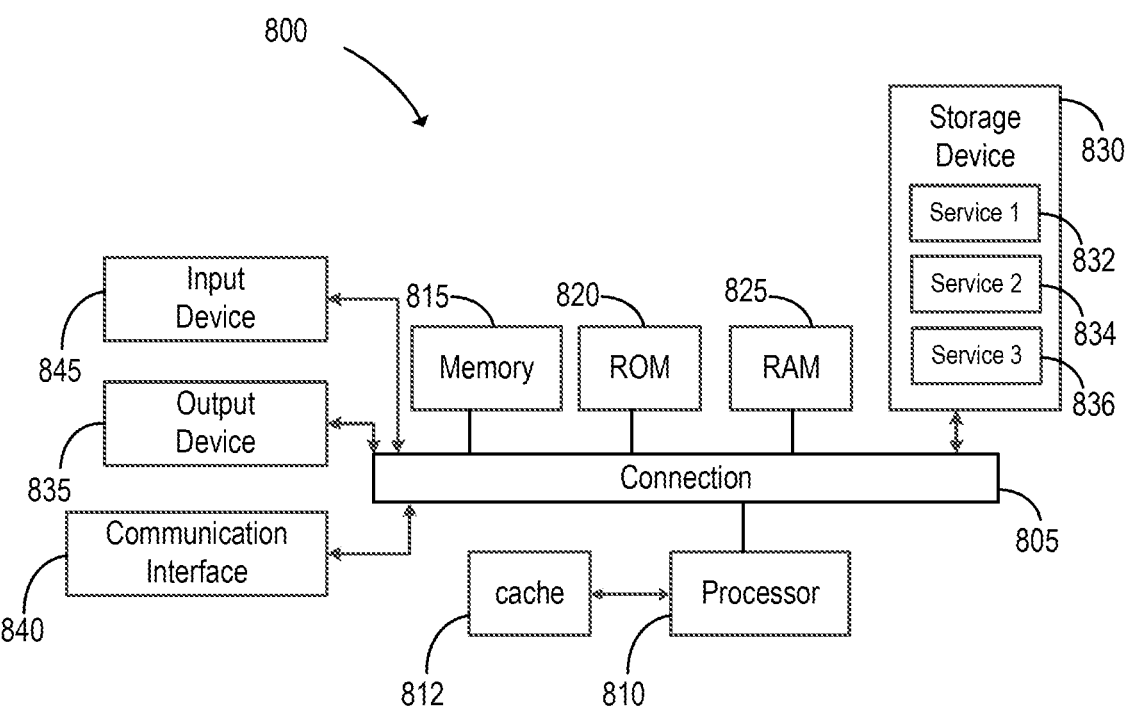
FIG. 8 shows an example of computing system, according to some aspects of the present disclosure.

FIG. 8 shows an example of computing system, according to some aspects of the present disclosure. Computing system 800 can be, for example, any computing device making up the cluster of network controller appliances, an ingress of a multi-tenant network, any of routers of FIG. 6, etc. Component(s) of computing system 800 may be in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: receiving, at an ingress of a multi-tenant network, a data packet, the data packet including a Virtual Network Identifier (VNI) identify a corresponding tenant for the data packet in the multi-tenant network; determining, at the ingress, a corresponding cluster of routers for processing the data packet based on the VNI, wherein the corresponding cluster of routers is one of a plurality of clusters of routers in the multi-tenant network; and forwarding the data packet to a router in the corresponding cluster of routers for processing.

Aspect 2. The method of Aspect 1, wherein the ingress is a virtualized network function layer configured to parse the data packet for determining the VNI in the data packet.

Aspect 3. The method of any of Aspects 1 to 2, wherein the ingress is any router in the multi-tenant network.

Aspect 4. The method of any of Aspects 1 to 3, further comprising: parsing the data packet to identify the VNI; determining a shard index associated with the VNI; and mapping the shard index to the corresponding cluster of routers.

Aspect 5. The method of any of Aspects 1 to 4, wherein the shard index is mapped to a Virtual IP (VIP) address of the corresponding cluster of routers.

Aspect 6. The method of any of Aspects 1 to 5, wherein the router is in a same Layer 2 domain as remaining routers in the corresponding cluster of routers, and forwarding the data packet to the router comprises: altering a Media Access Control (MAC) address in the data packet to reach the router; or forwarding the data packet to the router using an encapsulation protocol.

Aspect 7. The method of any of Aspects 1 to 6, wherein a control plane of each router in a given cluster of the plurality of clusters of routers receives route updates for VNIs associated with the given cluster of the plurality of clusters of routers.

Aspect 8. A network element of a multi-tenant network, comprising: one or more memories having computer-readable instructions stored therein; and one or more processors configured to execute the computer-readable instructions to: receive a data packet, the data packet including a Virtual Network Identifier (VNI) identify a corresponding tenant for the data packet in the multi-tenant network; determine a corresponding cluster of routers for processing the data packet based on the VNI, wherein the corresponding cluster of routers is one of a plurality of clusters of routers in the multi-tenant network; and forward the data packet to a router in the corresponding cluster of routers for processing.

Aspect 9. The network element of Aspect 8, wherein the network element is a virtualized network function layer configured to parse the data packet for determining the VNI in the data packet.

Aspect 10. The network element of any of Aspects 8 to 9, wherein the network element is any router in the multi-tenant network.

Aspect 11. The network element of any of Aspects 8 to 10, wherein the one or more processors are configured to execute the computer-readable instructions to determine the corresponding cluster of routers by: parsing the data packet to identify the VNI; determining a shard index associated with the VNI; and mapping the shard index to the corresponding cluster of routers.

Aspect 12. The network element of any of Aspects 8 to 11, wherein the shard index is mapped to a Virtual IP (VIP) address of the corresponding cluster of routers.

Aspect 13. The network element of any of Aspects 8 to 12, wherein the router is in a same Layer 2 domain as remaining routers in the corresponding cluster of routers, and the one or more processors are configured to execute the computer-readable instructions to forward the data packet to the router by: altering a Media Access Control (MAC) address in the data packet to reach the router; or forwarding the data packet to the router using an encapsulation protocol.

Aspect 14. The network element of any of Aspects 8 to 13, wherein a control plane of each router in a given cluster of the plurality of clusters of routers receives route updates for VNIs associated with the given cluster of the plurality of clusters of routers.

Aspect 15. One or more non-transitory computer-readable media comprising computer-readable instructions, which when executed by one or more processors at an ingress of a multi-tenant network, cause the ingress to: receive a data packet, the data packet including a Virtual Network Identifier (VNI) identify a corresponding tenant for the data packet in the multi-tenant network; determine a corresponding cluster of routers for processing the data packet based on the VNI, wherein the corresponding cluster of routers is one of a plurality of clusters of routers in the multi-tenant network; and forward the data packet to a router in the corresponding cluster of routers for processing.

Aspect 16. The one or more non-transitory computer-readable media of Aspect 15, wherein the ingress is a virtualized network function layer configured to parse the data packet for determining the VNI in the data packet.

Aspect 17. The one or more non-transitory computer-readable media of any of Aspects 15 to 16, wherein the ingress is any router in the multi-tenant network.

Aspect 18. The one or more non-transitory computer-readable media of any of Aspects 15 to 17, wherein the execution of the computer-readable instructions cause the ingress to determine the corresponding cluster of routers by: parsing the data packet to identify the VNI; determining a shard index associated with the VNI; and mapping the shard index to the corresponding cluster of routers.

Aspect 19. The one or more non-transitory computer-readable media of any of Aspects 15 to 18, wherein the shard index is mapped to a Virtual IP (VIP) address of the corresponding cluster of routers.

Aspect 20. The one or more non-transitory computer-readable media of any of Aspects 15 to 19, wherein the router is in a same Layer 2 domain as remaining routers in the corresponding cluster of routers, and the execution of the computer-readable instructions cause the ingress to forward the data packet to the router by: altering a Media Access Control (MAC) address in the data packet to reach the router; or forwarding the data packet to the router using an encapsulation protocol.

What is claimed is:

1. A method comprising:

receiving, at an ingress of a multi-tenant network, a data packet, the data packet including a Virtual Network Identifier (VNI) identifying a corresponding tenant for the data packet in the multi-tenant network;

determining, at the ingress, a corresponding cluster of routers for processing the data packet by:

parsing an encapsulation header of the data packet to identify the VNI;

determining, using a stateless algorithmic method applied to the VNI, a shard index associated with the VNI, wherein the stateless algorithmic method is one of a modulo operation or bitmasking of bits of the VNI; and mapping the shard index to an identifier of the corresponding cluster of routers associated with the VNI, wherein the corresponding cluster of routers is one of a plurality of clusters of routers in the multi-tenant network; and forwarding the data packet to a router in the corresponding cluster of routers for processing.

2. The method of claim 1, wherein the ingress is a virtualized network function layer configured to parse the data packet for determining the VNI in the data packet.

3. The method of claim 1, wherein the ingress is any router in the multi-tenant network.

4. The method of claim 1, wherein the identifier of the corresponding cluster of routers is a Virtual IP (VIP) address of the corresponding cluster of routers.

5. The method of claim 1, wherein the router is in a same Layer 2 domain as remaining routers in the corresponding cluster of routers, and forwarding the data packet to the router comprises:

altering a Media Access Control (MAC) address in the data packet to reach the router; or forwarding the data packet to the router using an encapsulation protocol.

6. The method of claim 1, wherein a control plane of each router in a given cluster of the plurality of clusters of routers receives route updates for VNIs associated with the given cluster of the plurality of clusters of routers.

7. A network element of a multi-tenant network, comprising:

one or more memories having computer-readable instructions stored therein; and one or more processors configured to execute the computer-readable instructions to:

receive a data packet, the data packet including a Virtual Network Identifier (VNI) identifying a corresponding tenant for the data packet in the multi-tenant network;

determine a corresponding cluster of routers for processing the data packet by:

parsing an encapsulation header of the data packet to identify the VNI;

determining, using a stateless algorithmic method applied to the VNI, a shard index associated with the VNI, wherein the stateless algorithmic method is one of a modulo operation or bitmasking of bits of the VNI; and mapping the shard index to an identifier of the corresponding cluster of routers associated with the VNI, wherein the corresponding cluster of routers is one of a plurality of clusters of routers in the multi-tenant network; and forward the data packet to a router in the corresponding cluster of routers for processing.

8. The network element of claim 7, wherein the network element is a virtualized network function layer configured to parse the data packet for determining the VNI in the data packet.

9. The network element of claim 7, wherein the network element is any router in the multi-tenant network.

10. The network element of claim 7, wherein the identifier of the corresponding cluster of routers is a Virtual IP (VIP) address of the corresponding cluster of routers.

11. The network element of claim 7, wherein the router is in a same Layer 2 domain as remaining routers in the corresponding cluster of routers, and the one or more processors are configured to execute the computer-readable instructions to forward the data packet to the router by:

altering a Media Access Control (MAC) address in the data packet to reach the router; or forwarding the data packet to the router using an encapsulation protocol.

12. The network element of claim 7, wherein a control plane of each router in a given cluster of the plurality of clusters of routers receives route updates for VNIs associated with the given cluster of the plurality of clusters of routers.

13. One or more non-transitory computer-readable media comprising computer-readable instructions, which when executed by one or more processors at an ingress of a multi-tenant network, cause the ingress to:

receive a data packet, the data packet including a Virtual Network Identifier (VNI) identifying a corresponding tenant for the data packet in the multi-tenant network;

determine a corresponding cluster of routers for processing the data packet by:

parsing an encapsulation header of the data packet to identify the VNI;

determining, using a stateless algorithmic method applied to the VNI, a shard index associated with the VNI, wherein the stateless algorithmic method is one of a modulo operation or bitmasking of bits of the VNI; and mapping the shard index to an identifier of the corresponding cluster of routers associated with the VNI, wherein the corresponding cluster of routers is one of a plurality of clusters of routers in the multi-tenant network; and forward the data packet to a router in the corresponding cluster of routers for processing.

14. The one or more non-transitory computer-readable media of claim 13, wherein the ingress is a virtualized network function layer configured to parse the data packet for determining the VNI in the data packet.

15. The one or more non-transitory computer-readable media of claim 13, wherein the ingress is any router in the multi-tenant network.

16. The one or more non-transitory computer-readable media of claim 13, wherein the identifier of the corresponding cluster of routers is a Virtual IP (VIP) address of the corresponding cluster of routers.

17. The one or more non-transitory computer-readable media of claim 13, wherein the router is in a same Layer 2 domain as remaining routers in the corresponding cluster of routers, and the execution of the computer-readable instructions cause the ingress to forward the data packet to the router by:

altering a Media Access Control (MAC) address in the data packet to reach the router; or forwarding the data packet to the router using an encapsulation protocol.

18. The method of claim 1, wherein a control plane of each router in a given cluster of the plurality of clusters subscribes to receiving route updates for VNIs having shard indices mapped to the given cluster.

19. The network element of claim 7, wherein a control plane of each router in a given cluster of the plurality of clusters subscribes to receiving route updates for VNIs having shard indices mapped to the given cluster.

20. The one or more non-transitory computer-readable media of claim 13, wherein a control plane of each router in a given cluster of the plurality of clusters subscribes to receiving route updates for VNIs having shard indices mapped to the given cluster.

\* \* \* \* \*